No. 696,824. Patented Apr. 1, 1902.
W. T. JONES.
WOOD TURNING MACHINE.
(Application filed July 26, 1901.)
(No Model.) 7 Sheets—Sheet 1.

WITNESSES:
INVENTOR
William T. Jones.
BY
ATTORNEYS

No. 696,824. Patented Apr. 1, 1902.
W. T. JONES.
WOOD TURNING MACHINE.
(Application filed July 26, 1901.)
(No Model.) 7 Sheets—Sheet 2.

WITNESSES:

INVENTOR
William T. Jones,
BY
ATTORNEYS

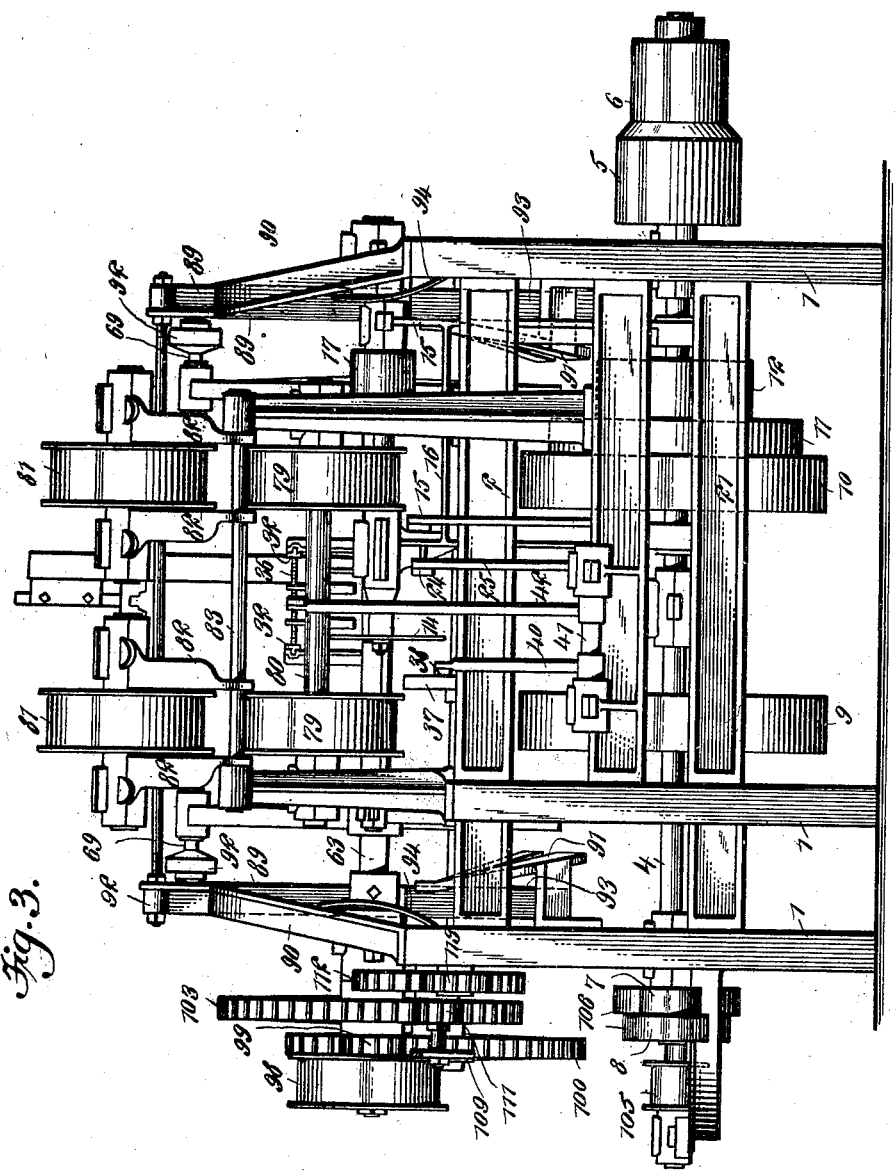

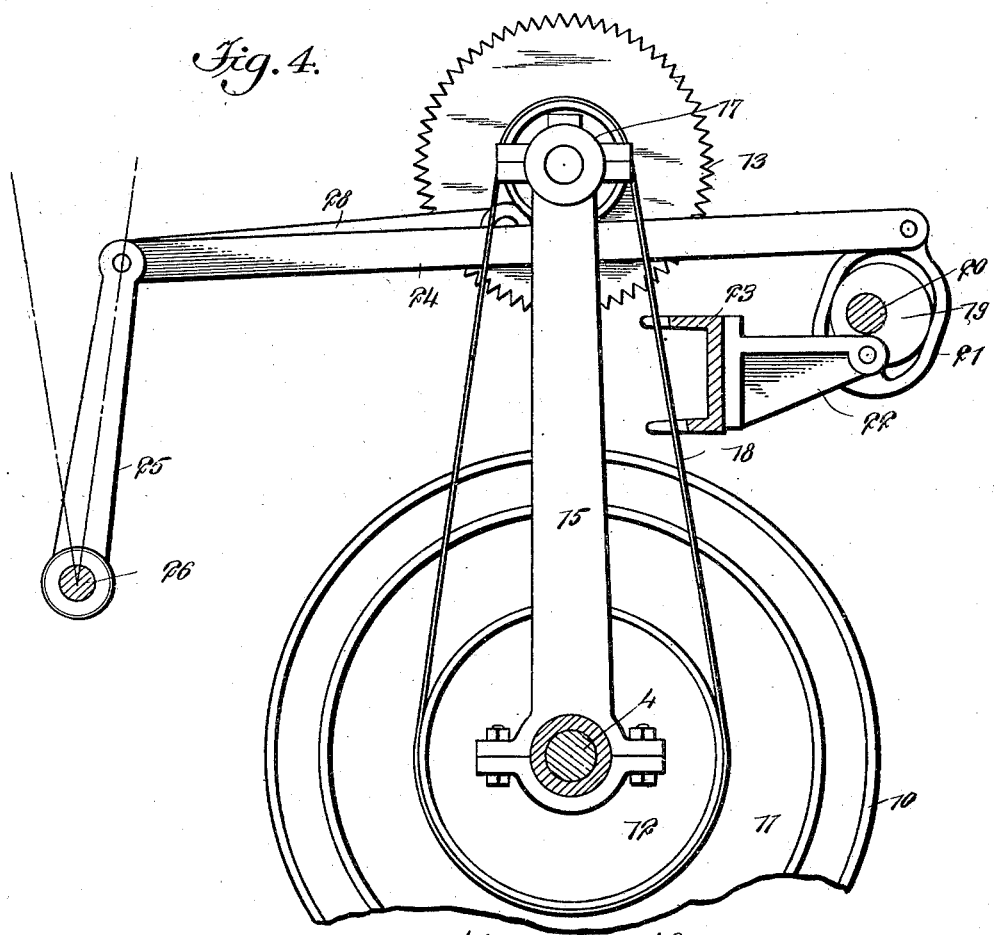
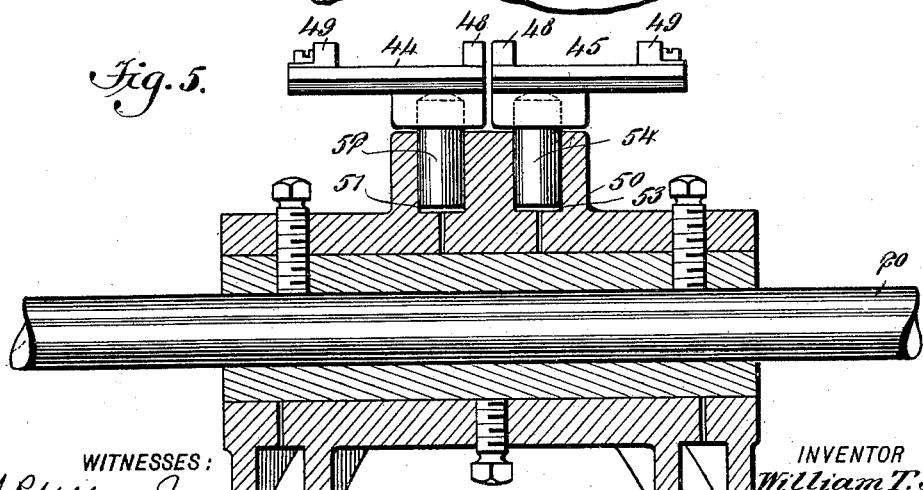

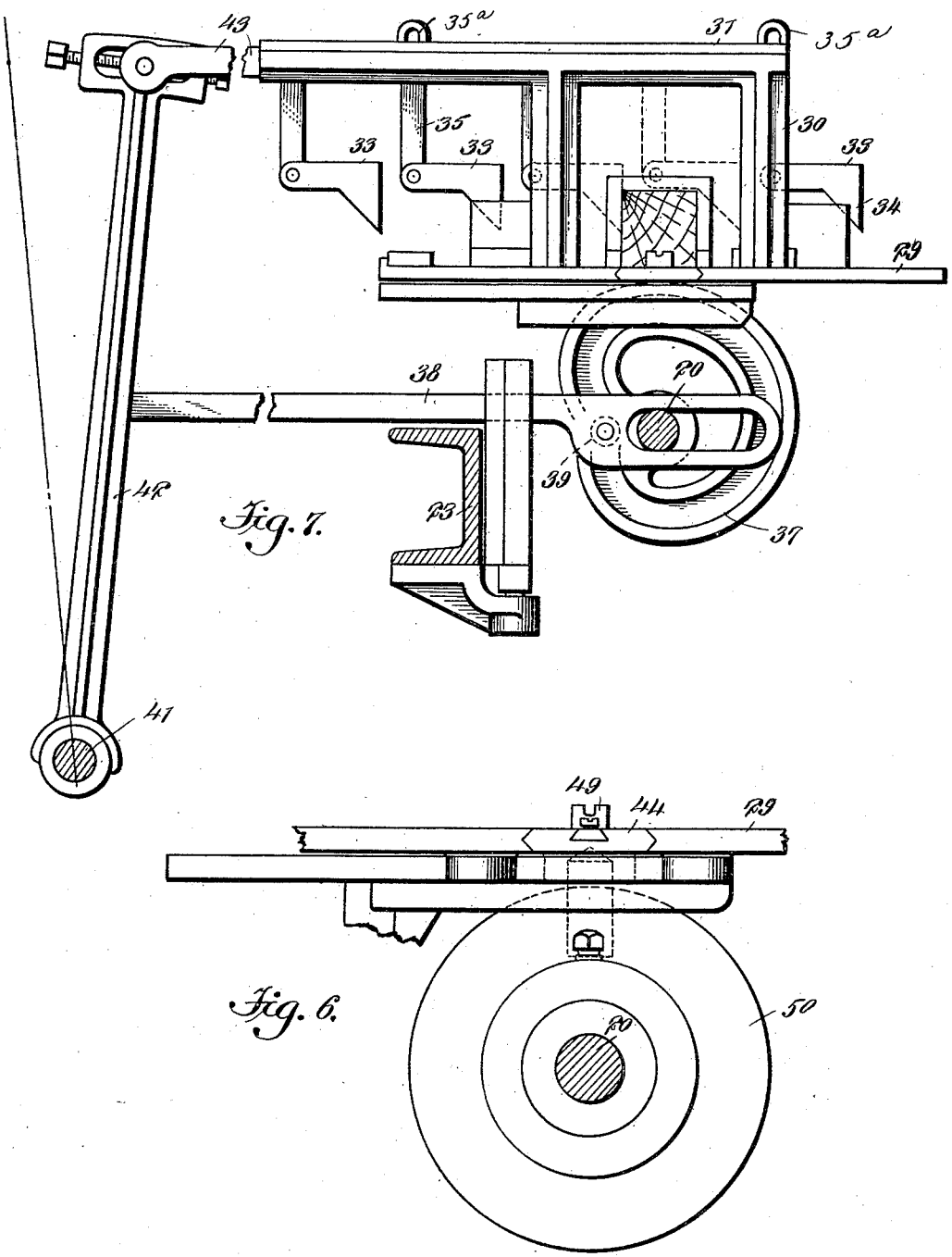

No. 696,824. Patented Apr. 1, 1902.
W. T. JONES.
WOOD TURNING MACHINE.
(Application filed July 26, 1901.)
(No Model.) 7 Sheets—Sheet 6.

WITNESSES:

INVENTOR
William T. Jones
BY
ATTORNEYS

No. 696,824. Patented Apr. 1, 1902.
W. T. JONES.
WOOD TURNING MACHINE.
(Application filed July 26, 1901.)
(No Model.) 7 Sheets—Sheet 7.

WITNESSES:

INVENTOR
William T. Jones
BY
ATTORNEYS

UNITED STATES PATENT OFFICE.

WILLIAM THOMAS JONES, OF NEW WESTMINSTER, CANADA, ASSIGNOR OF ONE-HALF TO HENRY DOYLE, OF SAN FRANCISCO, CALIFORNIA.

WOOD-TURNING MACHINE.

SPECIFICATION forming part of Letters Patent No. 696,824, dated April 1, 1902.

Application filed July 26, 1901. Serial No. 69,791. (No model.)

*To all whom it may concern:*

Be it known that I, WILLIAM THOMAS JONES, a subject of the King of Great Britain, residing at New Westminster, in the Province of British Columbia and Dominion of Canada, have invented a new and Improved Wood-Turning Machine, of which the following is a full, clear, and exact description.

This invention relates to improvements in wood-turning machines, and particularly for turning spools or similar small articles; and the object is to provide a machine practically automatic in its operation and by means of which a plurality of spool-blocks arranged in axial line may be simultaneously acted upon and finally ejected as finished spools. Other objects of the invention will appear in the general description.

I will describe a wood-turning machine embodying my invention, and then point out the novel features in the appended claims.

Reference is to be had to the accompanying drawings, forming a part of this specification, in which similar characters of reference indicate corresponding parts in all the figures.

Figure 1:
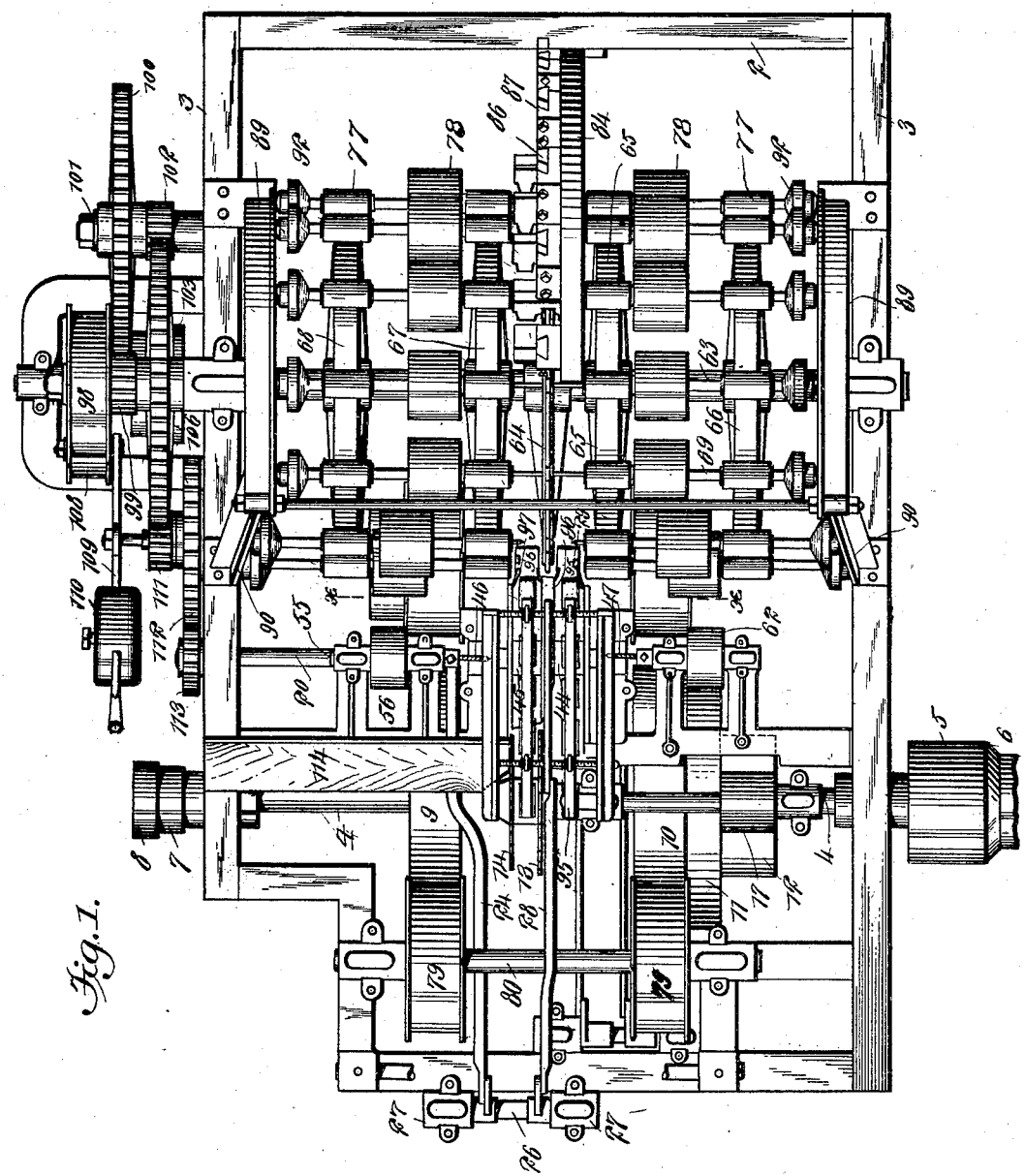
Figure 2:
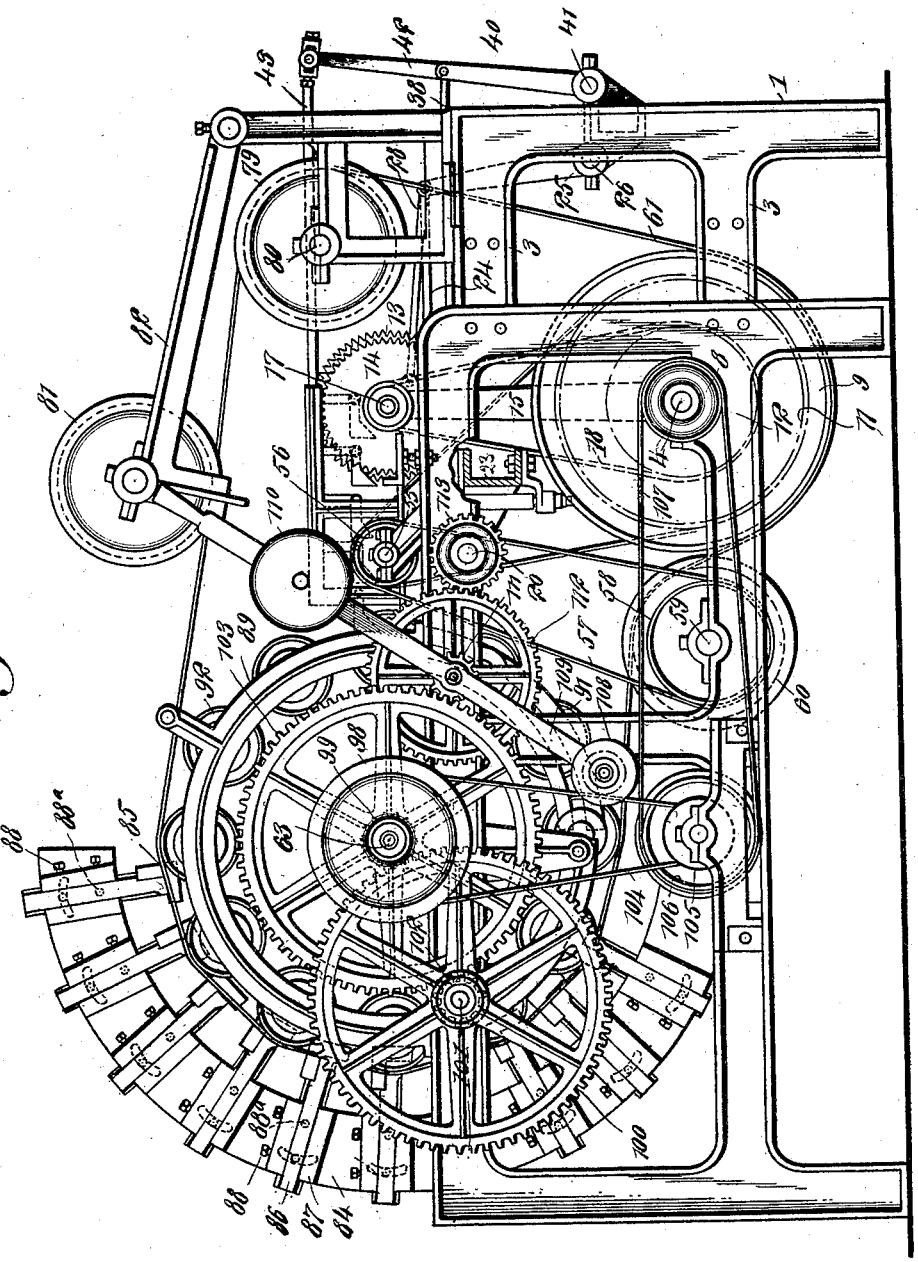
Figure 8:
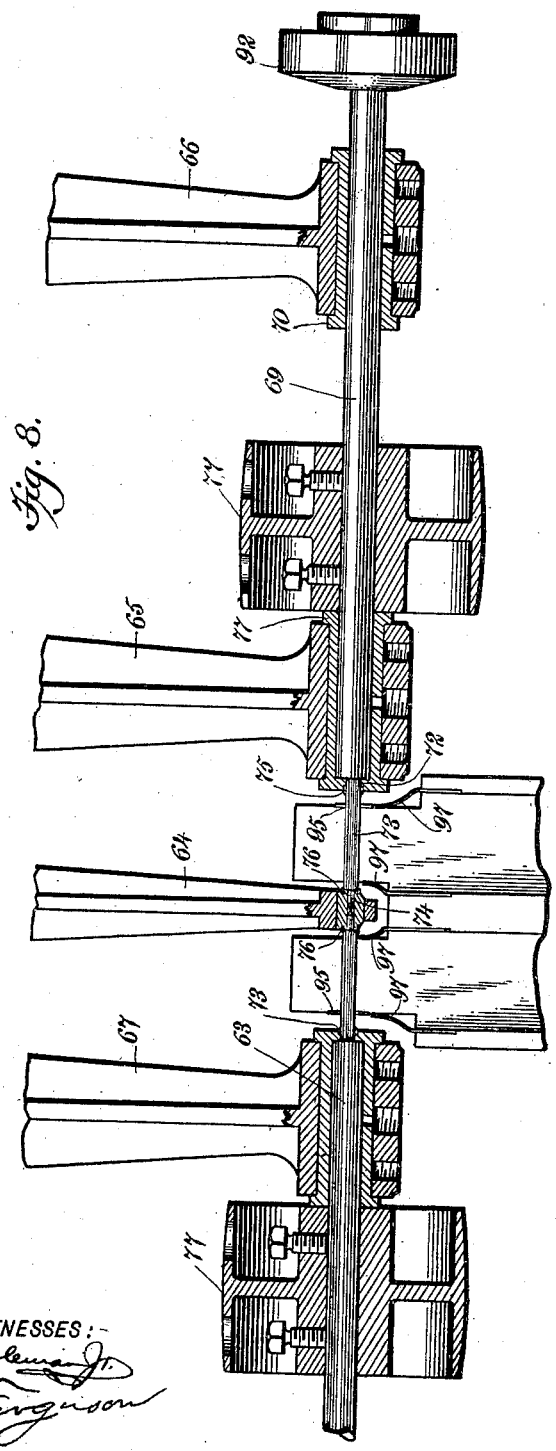
Figure 9:
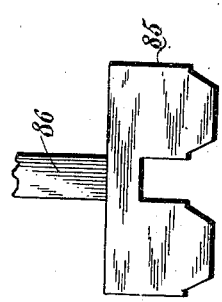
Figure 10:
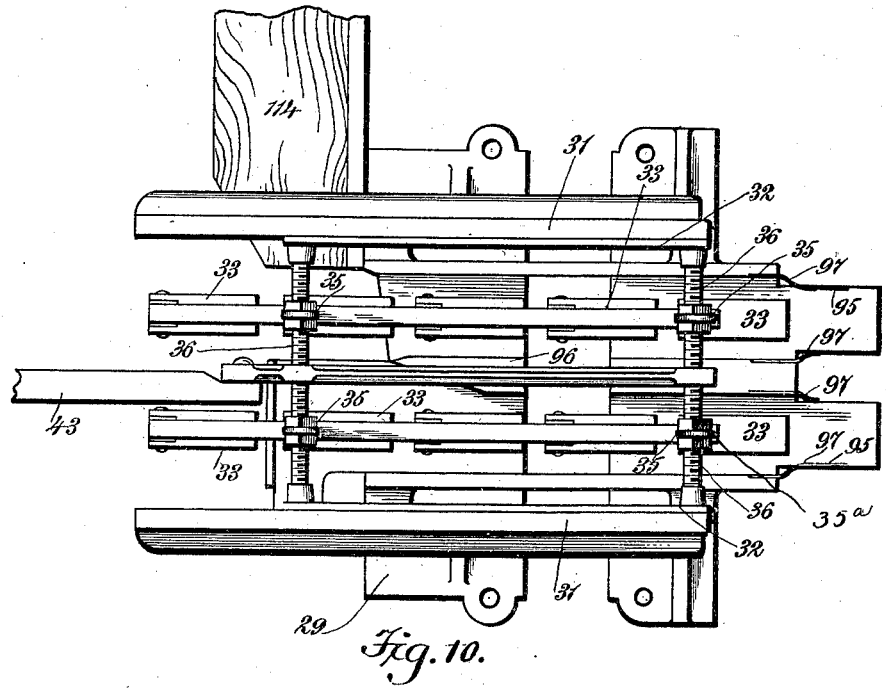
Figure 11:
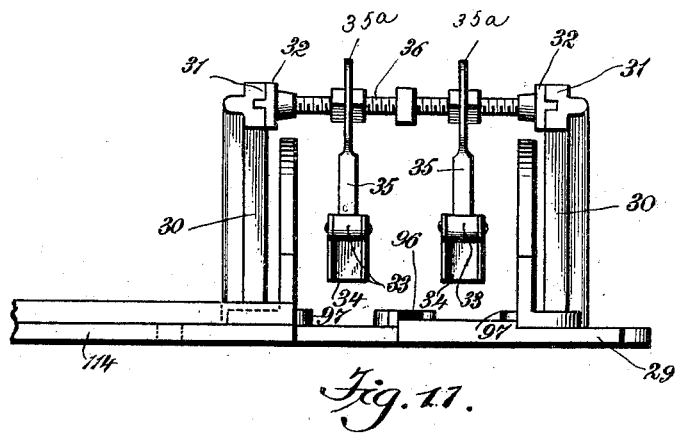

Figure 1 is a top plan view of a wood-turning machine embodying my invention. Fig. 2 is a side elevation thereof. Fig. 3 is an end view of the same. Fig. 4 is a detail showing means for swinging and operating a gang of saws. Fig. 5 is a sectional detail showing block-carriers and means for moving them to and from boring-tools. Fig. 6 is an edge view thereof. Fig. 7 is a detail showing a block-moving mechanism employed. Fig. 8 is a section substantially on the line *x x* of Fig. 1. Fig. 9 shows one of the knives employed. Fig. 10 is a plan view of a block-feeding mechanism employed, and Fig. 11 is a rear elevation thereof.

The frame of the machine comprises end uprights 1, connected by end bars 2 and side bars 3. Mounted in the forward portion of the machine and having bearings in the frame is a main driving-shaft 4, on one end of which at the outer side of the frame is a fixed driving-pulley 5 and a loose pulley 6. On the opposite end of the shaft 4 and at the outer side of the frame are step-pulleys 7 and 8. Also mounted on this driving-shaft are driving-pulleys 9 and 10 for operating the bands which impart movement to the spool-carrying spindles, as will be hereinafter described; and also fixed to the shaft (here shown at one side of the pulley 10) is a pulley 11 for operating one of the boring devices, and a pulley 12 on the shaft is designed to operate a gang of saws.

A gang of saws (here shown as two saws 13 and 14) is mounted on a spindle having bearings in a swinging frame comprising uprights 15. These uprights are connected by a cross-bar 16, and the lower portions of said uprights are mounted to swing on the driving-shaft 4, as clearly illustrated in Figs. 2, 3, and 4. On the spindle of the saws is a pulley 17, from which a band 18 extends to the pulley 12. It will be noted that one of the saws is of larger diameter than the other—that is, the saw farthest from the point in which the stick of wood from which the blocks are cut is of the larger diameter. The object of this is to cut off the farthest stick before the inner one is cut off, so as to provide a bearing temporarily to prevent the inner block or either of the blocks from being moved forward to the cutting device before the said inner block shall have been entirely severed from the stick.

A forward-and-back motion is imparted to the saw-carrying frame by means of an eccentric cam 19, mounted on a cam-shaft 20. This eccentric cam engages the walls of a cam-strap 21, which is pivotally connected at its lower end to a bracket 22, extended from a cross-bar 23 of the machine-frame. From the upper portion of this cam-strap a rod 24 extends to a lever 25, connected at its lower end to a rock-shaft 26, having bearings in blocks 27, arranged at one end of the machine. Also having pivotal connection with this rock-shaft is a pitman 28, which extends forward and connects with the swinging carrier of the saws. By the construction of the eccentric and eccentric-ring the saws will be given a much quicker return or back movement than the movement in the cutting direction, thus freeing the blocks of wood for subsequent operation.

Arranged along the top of the machine and adapted to receive blocks of wood from the saws is a guide-platform 29, upon the sides of which are affixed standards 30, having longitudinal rails 31 at the top, which provide guides for the side rails 32 of a carriage for block-moving fingers employed. These block-moving fingers 33 have downwardly-extended portions 34, which are inclined downward and forward at the edge toward the inlet end of the machine, the purpose of which will be hereinafter described. The shanks or substantially horizontal portions of these fingers are pivotally connected to hangers 35, adjustably mounted on rods 36, attached to the side rails 32. These rods 36, extended through slots in the loop portions 35ᵃ of opposite hangers, are shown as screw-rods, so that the fingers and the hangers may be adjusted laterally and vertically. There will be a series of these fingers at each side of the center of the machine, so as to engage the blocks severed by the two saws.

A back-and-forth motion is imparted to the finger-carriage by means of a heart-cam 37, mounted on the cam-shaft 20. An operating-bar 38 is mounted on a roller 39, which engages in the channel of the cam 37, and the end of said bar is provided with a slot through which the shaft 20 may pass, permitting the said bar to move longitudinally relatively to the shaft. The opposite end of this bar 38 is connected to a lever 40, extended upward from a rock-shaft 41, and also extended upward from this rock-shaft 41 is a lever 42, which has a link or rod connection 43 with the finger-carriage.

Movable transversely in the guide plate or table 29 are block-carriers 44 and 45 for moving the blocks to be bored to and from the boring-augers 46 and 47. These carriers 44 and 45 have their edges beveled in opposite directions and engaging in correspondingly-shaped channels formed in the plate 29, as clearly indicated in Figs. 6 and 7. Mounted on each carrier 44 45 is an inner stop-lug 48 and an outer stop-lug 49. These stop-lugs are designed to engage against the ends of the blocks to cause their movements with the carriers. The lugs 49 are shown as adjustable toward and from the lugs 48, so as to accommodate the carriers to different lengths of blocks, and they may be held as adjusted by means of set-screws.

Outward and inward movement is imparted to the carriers 44 and 45 in opposite directions by means of a cam-block 50, mounted on the cam-shaft 20. The cam-block has a spirally-disposed channel 51, into which a roller or lug 52, depending from the carrier 44, engages, and the cam-block also has a spirally-disposed channel 53, in which a roller or block 54, depending from the carrier 45, extends. These spiral channels are arranged in opposite directions, so that the two carriers will be simultaneously moved toward or from each other.

The boring-tool 46 has a chuck connection with a spindle 55, on which is a pulley 56, from which a band 57 extends to a connection with a pulley 58, mounted on a short shaft or stud 59. Also on this short shaft or stud 59 is a pulley 60, with which a band 61, driven by the pulley 9, engages. This band 61, as will hereinafter appear, operates one set of the spool or block carrying spindles.

The boring-tool 47 has a chuck connection with a shaft on which is a pulley 62, from which a band extends to the pulley 11 on the driving-shaft. By this arrangement it is obvious that the two boring-tools will be rotated in opposite directions.

Mounted in the frame is a reel-carrying shaft 63, on which is affixed a center spider 64, and at one side of the center spider is a spider 65 and a spider 66. The spider 65 is designed to support the inner ends of spindles, while the spider 66 is designed to support the body or outer portion of said spindles. Also connected to the shaft at the opposite side of the center spider is an inner supporting-spider 67 and an outer supporting-spider 68. Mounted to rotate in bearings formed in the inner and outer spiders is a series of spool or block engaging spindles 69, one of which is shown in detail in Fig. 8. In the bearings of the outer spiders are brass bushings 70, in which the spindles may rotate and move longitudinally, and the brass bearings 71, supported by the inner spiders, are designed to permit the rotary and longitudinal movements of the spindles; but the inner ends of these bushings or bearings 71 are provided with small openings 72, through which the reduced stems 73 of the spindles may pass, these reduced stems being designed to enter the bored holes in the blocks. The ends of these portions 73 are still further reduced, as at 74, to enter openings formed in the periphery of the center spider 64. Of course the bearings and the openings of the center spider will be arranged in axial line.

As a means for trimming off the bur around the ends of the holes in the blocks I provide on the ends of the bushings or bearings 71 small cutters 75, while similar cutters 76 are arranged at the opposite ends of the bearings in the center spider.

On each of the spindles carried by the spiders 65 and 66 is a pulley 77, designed to be engaged by a belt or band driven by the pulley 10 and similar to the belt or band 61, driven by the pulley 9. The belt or band 61, driven by the pulley 9, is designed to engage with pulleys 78, attached to the spindles carried by the spiders 67 and 68. The said spindle-driving bands pass over idlers 79, mounted on a shaft 80 at the front end of the machine, and are engaged by pressure-rollers 81 to take up the slack. These pressure-rollers 81 are mounted on arms 82, mounted to swing on a bar 83, supported by uprights of the machine.

Attached to the frame of the machine is a cutter-carrying plate 84. This is shown as segmental in form and concentric with the reel-carrying shaft. Mounted on this plate 84 is a series of cutters 85, which are successively arranged from the upper end to the lower end to cut gradually deeper into the wood, the last cutter of the series finishing the spools. Each cutter is designed to operate upon a plurality of blocks. I have here shown them (in Fig. 10) for operating upon two blocks, thus forming two spools at once. The cutters 85 are mounted on shanks 86, adjustable in blocks 87 on the plate 84. As here shown, these blocks 87 have channels the opposite walls of which are undercut to engage the corresponding edges of the shanks 86. The cutters may be held as adjusted by means of set-bolts 88, operating in the blocks and engaging against the shanks. The cutters may be adjusted as to their angle with relation to the spool-blocks by swinging the blocks 87. These blocks 87 are shown as pivotally connected, as at 88$^a$, to the plate 84, and from the blocks 87 near the outer ends lugs extend through arc slots in the plate 84, and these lugs may be engaged by fastening-nuts to hold the blocks as adjusted angularly.

Attached to the side rails of the frame and extending upward therefrom are presser-plates 89, portions 90 of the front of which are inclined downward and outward. These presser-plates are designed to engage with the outer ends of the spindles for forcing them into the blocks. The inclined portions 90 will gradually force the spindles in, and extended downward in a curved line from the rear ends of the straight portions of the presser-plates 89 are cams 91, designed to withdraw the spindles from the blocks. These cams 91 are shown as inclined from the center of the machine outward, and their free ends are inclined toward the inclined portions 90 of the pressers. Each cam 91 consists of two plates spaced apart, so that the spindles may pass between the same and engage collars 92 on the spindles against the inner surfaces of said plates. It will be seen that the upper or receiving ends of these cams 91 are sufficiently far from the discharge end 93 of the presser to permit the entrance of said collars 92. At the entrance end of the presser-plates and secured to the machine-frame are springs 94, which are designed when the spindles are passing the holes in the bored blanks or blocks to force the said spindles quickly into the holes and pick up the blanks on the spurs.

On the inner end of the block chute or carrier 29 and at opposite sides are steel blocks 95, which are designed to be adjusted so that the top edges will be just below the bottom of the holes in the opposite spool-blanks, and the spurs on the spindles engaging with the entering blanks or blocks rub on these steel blocks until they come to the top edges, so that the springs 94, as before described, may quickly force the spindles into the openings.

Arranged in the block-chute forward of the saws is a dividing-rib 96, which tapers off at its sides to nothing at its end adjacent to the saws. This rib 96 is designed to separate the two blocks as they approach the spindles, and the blocks are held until engaged by the spindles by means of spring-fingers 97, attached to the chute or plate 29.

Mounted on the reel-shaft 63 is a loose pulley 98, to one side of which is attached a pinion 99, which of course is also loose on the shaft 63. This pinion 99 meshes with a gear-wheel 100, mounted on a stud 101, extended from one side of the machine-frame, and attached to this gear-wheel 100 is a pinion 102, and this pinion 102 meshes with a gear-wheel 103, attached to the reel-shaft 63. By this means motion is imparted to the reel from the pulley 98. Directly below the pulley 98 and connected therewith by a band 104 is a pulley 105, on the shaft of which is a step-pulley 106, from a step of which a band 107 extends to the step-pulley 7 or 8 on the driving-shaft, depending upon the rate of speed desired. The band 104 is slack and may be tightened at the pleasure of the operator by means of an idler-pulley 108, engaging with said band, the said idler-pulley being mounted on a lever 109, on the upper end of which is adjustably arranged a weight 110. This lever 109 is mounted to swing on a boss extended from one side of the machine-frame, and it may be thrown back against the flanged pulley on the reel-shaft, when the belt will be too slack to give motion to the reel, or it may be thrown down, so that the pulley on the end of the lever will take up the slack of the belt by the weight overbalancing the pulley, and thus motion will be imparted to the reel.

Mounted on the same stud on which the lever 109 is fulcrumed is a pinion 111, which meshes with the gear-wheel 103, and connected to this pinion 111 is a gear-wheel 112, meshing with a pinion 113 on the cam-shaft 20, and by this means the said cam-shaft is rotated. The pinion 111 has twenty teeth and the gear-wheel 103 has one hundred and twenty teeth or a ratio of six to one. The wheel 112 has forty teeth, while the pinion 113 has twenty teeth. This gives the cam-shaft twelve revolutions for one of the reel-shaft or one revolution for each spindle carried by the reel.

It may be here stated that the saws are adjustable toward and from each other, that the sides of the block chute or table are adjustable toward and from each other, and that different widths of cutting-knives may be employed, thus permitting the machine to be adapted for different lengths of work to be operated upon.

In operation the attendant places the strip of wood upon the feeding-table 114 and pushes it up against a side of the block-chute and of course in the line of movement of the saws. The saw-carriage then moves forward and the saws cut off two blocks, the one next the stop being the first severed by the larger saw. The cam then causes the finger-frame to push forward the severed blocks half-way to the transverse block-carriages. The operator has in the meantime pushed the strip against the stop again and two more blocks are severed. The second fingers in the finger-frame ride upon the first blocks and drop down behind them as the finger-frame recedes. As the finger-frame advances again the first blocks are transferred to the block-carriages. The cam for operating said block-carriages moves them outward to push them against the boring-tools, and of course the boring-tools are then thrown out by the operation of the carriages—that is, by the inward movement of the carriages. These operations are repeated until two bored blocks are opposite the spurs on the reels. These each pick up a spool-blank. The spurs are pushed through the blanks until the ends of the spurs rest in the bearings of the center spider. As the reel revolves the pulleys on the spindle come in contact with the belts on the main shaft of the machine, thus imparting a rapid rotary motion to the spindles and spool-blanks, and as the reel continues its revolution the spool-blanks come in contact with the cutters, each one of which has a part assigned to it.

When the spindles have passed the last cutters, the spools are finished, and the return-cams engage the collars on the ends of the spindles, so that the spindles are withdrawn, and the finished spools drop off. This operation goes on continuously, each spindle taking up its spool-blank in turn.

Having thus described my invention, I claim as new and desire to secure by Letters Patent—

1. In a wood-turning machine, a plurality of saws arranged in axial alinement for cutting off blocks, means for supporting the wood transversely of the saws, means for carrying the blocks from the saws, a series of knives, and means for moving the blocks in axially-alined pairs past the knives with a rotary motion, substantially as specified.

2. In a wood-turning machine, a plurality of saws arranged in axial alinement for cutting off blocks from a strip of wood, means for supporting the wood transversely of the saws, means for moving the blocks in axially-alined pairs simultaneously from the saws, boring-tools for forming holes lengthwise in the blocks, means for moving the blocks toward and from said boring-tools, a series of knives, and means for moving the blocks past the knives with a rotary motion, substantially as specified.

3. In a wood-turning machine, a pair of saws arranged side by side, one saw being of larger diameter than the other, means for supporting the work transversely to the plane of the saws, a swinging frame in which the saws are mounted, means for moving said frame, boring-tools, means for moving the blocks to the boring-tools, means for moving the blocks onto and off the boring-tools, two series of spindles for receiving the blocks, a series of cutters or knives, and means for moving said spindles carrying the blocks past the cutters, substantially as specified.

4. In a wood-turning machine, a plurality of saws in axial alinement and having a swinging motion, means for causing said swinging motion, opposite boring-tools, means for rotating said boring-tools, means for carrying blocks to the said boring-tools, means for supporting the work to be moved transversely of the saws, means for moving the blocks onto and off from said boring-tools, a reel, means for rotating the reel, a series of spindles for each saw carried by said reel and having a rotary and a longitudinal movement in the reel, means for carrying the blocks from the boring-tools to the reel to be engaged by the spindles, means for rotating the spindles while moving with the reel, and a series of cutters arranged concentrically with the reel, substantially as specified.

5. In a wood-turning machine, a plurality of saws of different diameters, means for moving said saws toward and from a strip of wood from which blocks are to be severed, means for supporting the stick of wood transversely to the saws, boring-tools, means for moving the severed blocks from the saws to the boring-tools, a reel, two series of spindles carried by said reel and mounted to rotate and to move longitudinally therein, means for causing the rotary movement of the spindles while the reel is rotated, means for forcing the spindles into the holes bored in the blocks, cutters arranged concentrically with the reel for operating on said blocks, and means for withdrawing the spindles from the blocks after passing the last of the cutters, substantially as specified.

6. In a wood-turning machine, a plurality of saws for simultaneously severing blocks from a stick, opposite boring-tools, means for rotating said boring-tools in opposite directions, means for directing a stick transversely of the saws, a block table or chute, a frame movable thereon, swinging fingers carried by said frame for engaging with the blocks and moving them along, means for moving said frame and fingers, a reel, two sets of spindles carried by the reel and having rotary and longitudinal movement therein, cutting-blades arranged concentric with the reel, means for imparting motion to the reel, means for rotating the spindles with the blocks, and means for withdrawing the spindles from finished work after leaving the last of the knives, substantially as specified.

7. In a wood-turning machine, the combination with cutters, of a reel, comprising a shaft, a center spider mounted on the shaft and having openings or bearings in its periphery, pairs of spiders on opposite sides of said center spider and having bearings, spindles mounted to rotate in the bearings of the said side pairs of spiders and also to move longitudinally therein, the said spindles having end portions to engage in the bearings of the center spider, means for rotating the spindles and means for rotating the reel, substantially as specified.

8. In a wood-turning machine, a plurality of cutting-blades arranged in the segment of a circle, each of said blades having separated cutting-surfaces for operating upon a plurality of blocks arranged in axial line, and means for moving the blocks in alined pairs past the cutting-blades, substantially as specified.

9. In a wood-turning machine, a reel, block-engaging spindles mounted in said reel, so as to rotate and to move longitudinally, the spindles being arranged in pairs, one spindle of a pair being in axial line with the other spindle of the pair, means for moving said spindles inward to engage in openings formed in the blocks, segmentally-arranged cutting-blades, means for holding the spindles in the blocks while moving past said cutting-blades, a central spider on the reel coacting with both series of spindles, means for drawing the spindles outward from the blocks, means for rotating the spindles, and means for rotating the reel, substantially as specified.

10. In a wood-turning machine, a pair of saws arranged side by side, a swinging frame in which the saws are mounted, means for swinging said frame, opposite augers fixed as to longitudinal movement but having means for rotating the same, means for moving blocks of wood to the augers, block-carriages for receiving said blocks, means for moving said carriages laterally onto and off the augers, and turning or cutting devices for operating upon the blocks of wood, substantially as specified.

11. In a wood-turning machine, a pair of saws in axial alinement, a block-chute in which the saws operate, a frame movable in side portions of the chute, means for moving the frame back and forth, fingers mounted to swing relatively to the frame, means for supporting a stick transversely of the saws, cutting devices for receiving blocks from said block-chute, spring-fingers at the outlet end of said block-chute, and duplicate means for engaging the blocks held by said spring-fingers and carrying them along the cutters, substantially as specified.

12. In a wood-turning machine, a reel comprising a center spider having a plurality of transverse openings or bearings in its periphery, bur-cutters at the opposite ends of said openings, spiders at the opposite sides of the center spider, said spiders having bearings for spindles, spindles mounted to rotate and to move longitudinally in said side spiders, the spiders adjacent to the center spider having bur-cutters at the inner ends of their openings, cutting-knives arranged concentrically with the reel, means for rotating the reel to carry blocks of wood against the cutting-knives, the said blocks of wood being supported by the spindles, means for rotating the spindles, and means for moving the spindles longitudinally in the spiders, substantially as specified.

13. In a wood-turning machine, a pair of saws operating to simultaneously sever two blocks from a stick, a swinging frame in which the saws are mounted, a block chute or table in which the saws are movable, means for moving severed blocks along said chute or table, means for separating opposite blocks one from the other as they move along the chute or table, cutting-knives, means for supporting a stick transversely of the saws, and means for carrying the blocks in pairs from the chute or table to the cutting-knives, substantially as specified.

14. In a wood-turning machine, a plurality of saws, means for moving said saws toward and from a strip of wood to be operated upon, a chute or table in which the blocks are movable, means for moving the blocks along said chute or table, laterally-movable carriages for the blocks, adjustable holding devices on said carriages, means for moving said carriages simultaneously in opposite directions, a reel, a double row or set of spindles carried by said reel and adapted for engaging with the blocks as received from the chute or table, means for rotating said spindles as the reel rotates, and cutting-knives against which the blocks are moved by the reel, substantially as specified.

In testimony whereof I have signed my name to this specification in the presence of two subscribing witnesses.

WILLIAM THOMAS JONES.

Witnesses:
J. R. GRANT,
H. FEARENSIDE.